(12) United States Patent
Austerlitz et al.

(10) Patent No.: US 8,736,113 B2
(45) Date of Patent: May 27, 2014

(54) METHOD AND SYSTEM FOR LIMITING ENERGY TO A SENSOR

(75) Inventors: Howard Austerlitz, Stony Brook, NY (US); Ron Bueter, Cary, NC (US); John O'Brien, Islip Terrace, NY (US)

(73) Assignee: Parker Hannifin Corporation, Cleveland, OH (US)

( * ) Notice: Subject to any disclaimer, the term of this patent is extended or adjusted under 35 U.S.C. 154(b) by 658 days.

(21) Appl. No.: 13/008,938

(22) Filed: Jan. 19, 2011

(65) Prior Publication Data

US 2011/0187182 A1   Aug. 4, 2011

Related U.S. Application Data

(60) Provisional application No. 61/300,171, filed on Feb. 1, 2010.

(51) Int. Cl.
*H03K 3/00* (2006.01)

(52) U.S. Cl.
USPC ............. 307/106; 307/147; 307/65; 307/44; 307/42; 307/46; 363/147; 363/65; 363/88

(58) Field of Classification Search
USPC .......... 307/106, 43, 237, 264, 300; 323/9, 20; 205/687; 361/18, 79, 83; 702/106; 250/577, 227.11, 227.55; 713/300
See application file for complete search history.

(56) References Cited

U.S. PATENT DOCUMENTS

| | | | |
|---|---|---|---|
| 2,817,351 A | 12/1957 | Kling | |
| 2,838,928 A | 6/1958 | Bergeson | |
| 2,840,097 A | 6/1958 | Farkas | |
| 2,899,151 A | 8/1959 | Levine | |
| 2,960,294 A | 11/1960 | Johnston et al. | |
| 3,389,602 A | 6/1968 | Clemens | |
| 3,509,942 A | 5/1970 | Lindberg | |
| 4,180,768 A * | 12/1979 | Ferraro | 323/278 |
| 4,898,030 A | 2/1990 | Yeh | |
| 4,932,609 A | 6/1990 | Secchiaroli et al. | |
| 5,880,480 A * | 3/1999 | Ellinger et al. | 250/577 |
| 2007/0175766 A1* | 8/2007 | Holmes et al. | 205/687 |
| 2007/0246608 A1 | 10/2007 | Tichborne et al. | |
| 2009/0228229 A1* | 9/2009 | Trandafir | 702/106 |
| 2011/0029788 A1* | 2/2011 | Domingo et al. | 713/300 |

* cited by examiner

*Primary Examiner* — Rexford Barnie
*Assistant Examiner* — Jagdeep Dhillon
(74) *Attorney, Agent, or Firm* — Renner, Otto, Boisselle & Sklar, LLP.

(57) ABSTRACT

A method and system for limiting energy to a sensor and/or an environment in which the sensor is located. A high current sensor driver is powered through a resistance-capacitance (RC) circuit. In a failure mode, the RC circuit constrains output of a sensor driver to the sensor in order to limit average current applied to the sensor. In one embodiment, the capacitor is chosen so that it can provide adequate current to the sensor driver for a short period of time. The value of the resistor may be chosen to ensure that under short circuit conditions direct current (DC) is limited to a safe value. The combined values of the resistor and capacitor may be adjusted such that the capacitor can charge to a prescribed level during the interval between active pulses.

30 Claims, 4 Drawing Sheets

METHOD AND SYSTEM FOR LIMITING ENERGY TO A SENSOR

RELATED APPLICATION DATA

The present application claims the benefit of U.S. Provisional Application Ser. No. 61/300,171, filed Feb. 1, 2010, the disclosure of which is incorporated by reference in its entirety.

BACKGROUND OF THE INVENTION

In the wake of the TWA Flight 800 accident, electric sensors situated in aircraft fuel tanks are being subjected to increasingly tighter restrictions. These mandates, among other factors, limit the amount of electrical energy that can enter a fuel tank to a level below that which could generate a spark and ignite an explosion, for example. These limitations apply to operating energy supplied to in-tank sensors under normal conditions as well as when the electrical equipment might fail, as well as when the aircraft is subjected to a lightning event.

SUMMARY

One aspect of the present invention relates to a method and system for limiting energy to a sensor and/or an environment in which the sensor is located. A high current sensor driver is powered through a resistance-capacitance (RC) circuit. In a failure mode, the RC circuit constrains output of a sensor driver to the sensor in order to limit average current applied to the sensor. In one embodiment, the capacitor is chosen so that it can provide adequate current to the sensor driver for a short period of time. The value of the resistor may be chosen to ensure that under short circuit conditions direct current (DC) is limited to a safe value. The combined values of the resistor and capacitor may be adjusted such that the capacitor can charge to a prescribed level during the interval between active pulses.

One aspect of the invention relates to an energy limiting circuit including: a pulse generator operable to generate pulses at a prescribed frequency; a sensor driver operable to supply a pulsed excitation voltage to an associated sensor, wherein the sensor driver outputs a sensor driver signal that corresponds to the waveform received from the pulse generator; a resistance-capacitance (RC) circuit coupled between an associated drive voltage source and the sensor driver, wherein the RC circuit constrains output of the sensor driver signal to limit average current applied to the associated sensor.

Another aspect of the invention relates to a method for limiting output energy to an associated sensor, the method including: receiving a pulsed waveform at a predetermined frequency for input to a sensor driver; receiving a driving voltage at the sensor driver from a resistor-capacitor (RC) circuit; and outputting a sensor driving signal to the associated sensor, wherein the RC circuit constrains output of the sensor driver signal until the capacitor is charged in order limit average energy output to the associated sensor.

Another aspect of the invention relates to a communication system for controlling a sensing device on an associated aircraft, the system including: a sensor operably positioned in a fuel tank of an associated aircraft, wherein the sensor senses at least one physical parameter associated with the fuel tank; a pulse generator operable to generate a waveform at a predetermined frequency; a sensor driver operable to supply a pulsed excitation voltage to the sensor, wherein the sensor driver receives an input signal and outputs a sensor driver signal that corresponds at least in part to the waveform received from the pulse generator; and a resistance-capacitance (RC) circuit coupled between an associated drive voltage source and the sensor driver, wherein the RC circuit constrains output of the sensor driver signal to limit average current applied to the associated sensor.

Other systems, devices, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

It should be emphasized that the term "comprise/comprising" when used in this specification is taken to specify the presence of stated features, integers, steps or components but does not preclude the presence or addition of one or more other features, integers, steps, components or groups thereof. This invention uses an ultrasonic sensor as an example of a device residing in an aircraft fuel tank that must meet these energy limitation requirements. Other in-tank sensors that have similar requirements, such as pulsed RF sensors, could also benefit from this invention.

BRIEF DESCRIPTION OF THE DRAWINGS

Embodiments of this invention will now be described in further detail with reference to the accompanying drawings, in which.

DETAILED DESCRIPTION OF EMBODIMENTS

One aspect of the present invention is directed to a system and method for limiting output energy to an associated sensor. Aspects of the present invention are particularly applicable to situations when it is desired and/or required to limit output energy in a particular environment and/or to a particular device, for example.

Figure 1:
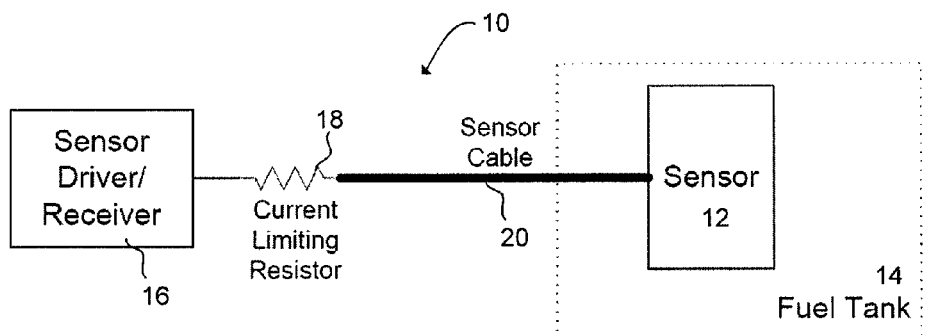
FIGS. 1 and 2 are exemplary sensor systems.

FIG. 1 illustrates a conventional sensor system 10. The system 10 includes a sensor 12 disposed within a fuel tank 14, a sensor driver 16, a current limiting resistor 18 and a cable 20. For example, the sensor 12 may be a fuel level sensor or any other desired sensor placed within an aircraft fuel tank 14 or other environment in which it may be desirable to limit energy provided within the environment.

The sensor driver 16 is a circuit or device that provides input to the sensor 12 and/or controls operation of the sensor 12. The sensor driver 16 may be configured to provide conditioning signals for input and output communications with the sensor 12.

The current limiting resistor 18 generally includes one or more resistors that limit the electrical current applied to the sensor 12 to safe levels. Generally, a single resistor may be used to perform this function. One or ordinary skill in the art will realize that the prescribed safe levels may vary based on varying safety, design and/or environment requirements in which the system 10 is to be used.

The sensor 12 may be any suitable sensor. For illustrative purposes, the sensor 12 is described in terms of a fuel sensor (e.g., a sensor used to determine the amount of fuel in an aircraft fuel tank. However, a person having ordinary skill in the art will readily appreciate that the sensor 12 may be any type of sensor that may be used for any desired purpose. Furthermore, the sensor 12 may be suitable other environments, as well.

The cable 20 may be any type cable or wire that is configured to facilitate communications between the sensor 12 and the sensor driver 16. For example, the cable 20 may take the form of a plurality of conductors, twisted pair conductors, shielded twisted pair conductors, etc. In general, the cable 20 may include connectors on each end to facilitate coupling the cable 20 to the sensor 12 and the sensor driver 16. Alternatively, the cable 20 may be coupled to the sensor 12 and/or the sensor driver 16 by welding or other permanent (or semi-pseudo-permanent) connection mechanism.

One of ordinary skill in the art will readily appreciate that unsafe amounts of electrical energy can enter a fuel tank via multiple ways. The most common case may be from the normal operating conditions of the electronic interface connected to the in-tank sensor 12. In the embodiment set forth in FIG. 1, if the sensor driver 16 fails (e.g., encounters a power supply short-circuit to an output line, etc.), the current limiting resistor 18 will prevent the current level from exceeding the prescribed safe levels.

One problem with the approach identified in FIG. 1 is that when using devices, such as ultrasonic or RF sensors, which operate at relatively high frequencies (in the megahertz range or higher), the capacitance of the sensor cable 20 itself along with the sensor's (e.g., sensor 12) inherent capacitance form a low pass filter with the current limiting resistor 18. This results in significant attenuation of the sensor signal. For example, if the current value of the current limiting resistor 18 is 1000 ohms and the total capacitance of the sensor and cable is 2000 picofarads, a sensor operating at 5 megahertz would have its output signal attenuated by approximately 36 dB, which is unacceptable.

Many high frequency sensors, including ultrasonic sensors and RF sensors, operate in a pulsed signal mode, typically operating at low duty cycles. The instantaneous current needed to drive the sensor may be fairly high (1 ampere or more). However, the low duty cycle of such a sensor (typically 0.1%) makes the average current fairly low (on the order of milliamps) and below safety limits.

Figure 2:
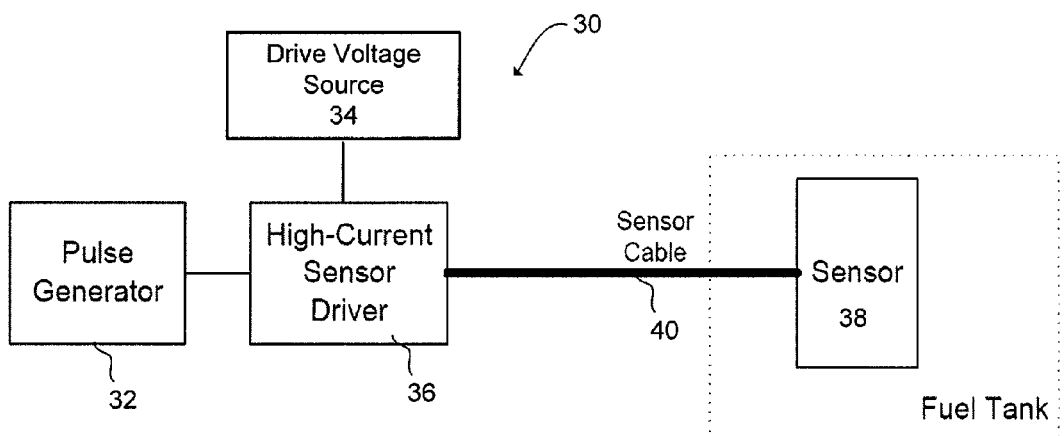
Figure 3:
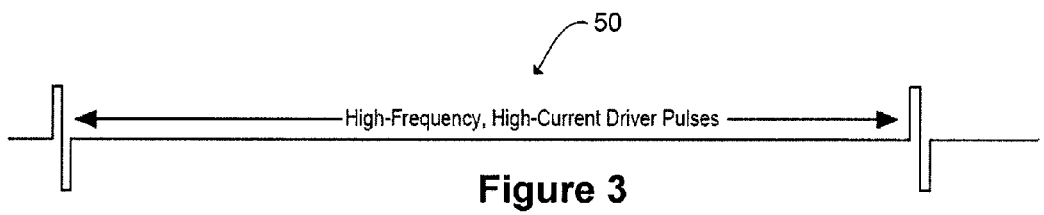
FIG. 3 is an exemplary series of pulses used to drive the system illustrated in FIG. 2.

FIG. 2 illustrates a pulsed sensor system 30. The system 30 includes a pulse generator 32, a drive voltage source 34, a sensor driver 36, a sensor 38 and a cable 40. In operation, the pulse generator 32 outputs a series of pulses to the sensor driver 36. An exemplary series of pulses (or waveform) 50 is illustrated in FIG. 3. The series of pulses 50 is illustrated as a step function having a high frequency and high current driver pulses. A series of pulses (or waveform) having any desired frequency and/or current is deemed to fall within the scope of the present invention. In general, the current may be 0.1 ampere or more and the step function has a narrow width in order to limit the duty cycle, which makes the average current low. One of ordinary skill in the art will appreciate that the duty cycle may be dependent on one or more of the following: sensor type, sensor environment, safety criterion, etc. In one embodiment, it is desirable for a duty cycle to be less than 0.5%, and more particularly less than or equal to 0.1%, for example.

The sensor driver 36, charged by the drive voltage source 34, conditions the signals for input and output to the sensor 38 on the cable 40. One problem with system 30 is that there is no limiting device for preventing a faulty driver 36 from sending high current levels into the fuel tank or other environment in the event of a failure mode (e.g., sensor wires short-circuit and a driver fault keeps it turned on continuously).

Aspects of the present invention are directed to a simple, passive circuit that may be used to prevent the sensor driver 36 from sending a high average current into the fuel tank or other environment. While a fairly complex, active circuit can be used to sense unsafe current levels and then turn off the driver, such a circuit has lower reliability than a passive approach. Also, the active circuit would require built-in-test circuits to verify its operation (and system safety) on an aircraft. As used herein, the term "passive" means a circuit that does not introduce gain or does not have a directional function.

One aspect of the invention utilizes a sensor disposed within the fuel tank of an aircraft to determine a physical characteristic associated with the fuel tank. A person of ordinary skill in the art will readily appreciate that aspects of the present invention have far ranging appeal and should not be limited solely to a fuel tank environment, but may be applicable to any environment in which it may be desirable to limit energy provided to an electrical device located within the environment.

Figure 4:
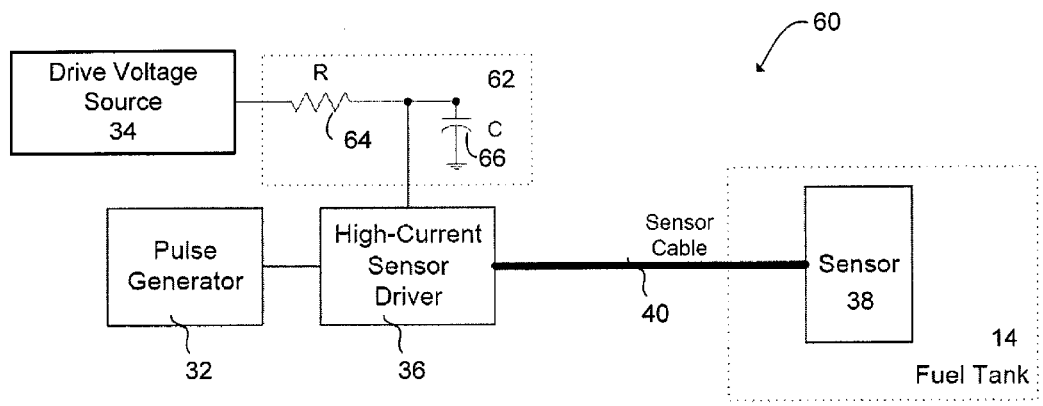
FIGS. 4-5 are exemplary systems in accordance with aspects of the present invention.

An exemplary system 60 in accordance with aspects of the present invention is illustrated in FIG. 4. The system 60 is identical to the system 50, except that the sensor driver 36 is powered through a resistance-capacitance (RC) circuit 62, which includes a resistor 64 and a capacitor 66 coupled in series, instead of directly by the drive voltage source 34. In particular, in system 30, the drive voltage source 34 is coupled directly to the sensor driver 36 and the sensor driver 36 is always in an active state in order to output pulses received from the pulse generator 32 to the sensor 38. In contrast, with respect to system 60, the drive voltage source 34 is utilized to charge the capacitor 66 of the RC circuit 62. When the capacitor 66 is charged to the prescribed amount (e.g., charged to a value that is sufficient to drive the sensor driver 36), pulses received from the pulse generator 32 at the sensor driver 36 may be output to the sensor 38 through the sensor cable 40.

The RC circuit 62 presents a high impedance and low current limit for direct current (DC) voltages through the resistor 64, but also provides a limited amount of high current through the charge on the capacitor 66. The value of the capacitor 66 is chosen so that it can provide adequate current to the sensor driver 36 circuit for the short period of time required. The value of the resistor 64 is chosen to ensure that under short-circuit conditions DC current is limited to a safe value. The combined values of the resistor 64 and the capacitor 66 may be adjusted so that the capacitor 66 can charge to the prescribed value, which is sufficient to drive the sensor driver 36, during the interval between active pulses. The time delay for charging the capacitor 66 of the RC circuit 62 effectively limits a duty cycle associated with the associated sensor.

In one embodiment, the operation of the sensor driver 36 may be controlled by a processor (not shown). The processor may also be operable to automatically adjust resistor 64 and capacitor 66 values so the capacitor can fully charge between outputting of the sensor driving signal to the associated sensor 38.

System 60 not only limits excess energy against high DC currents due to short-circuits, system 60 also protects against large pulse duty cycles caused by a fault condition in the pulse generator 32. For example, pulse generator 32 may exhibit fault conditions by either producing too many pulses in a time interval or generating pulses that are too wide. Both of these fault conditions makes the duty cycle too high. Under these fault conditions, the capacitor 66 does not have enough time to recharge between each pulse. As a result, the voltage on the capacitor 66 drops well below the normal (also referred to as the prescribed amount) drive voltage. Each pulse received in this condition, lowers the energy supplied to the sensor driver 36. Since the storage energy in a capacitor, is given by the equation $E=\frac{1}{2}*C.*V^2$, as the voltage drops by a factor of 2, the driver energy drops by a factor of 4. Thus, the overall average energy supplied to the sensor driver 36 is limited, regardless of any faults in the pulse generator 32. Therefore, the average energy that the sensor driver 36 supplies to the sensor 38 in the fuel tank (or other environment) is similarly limited to a safe value. Since the basis of the system 60 uses passive components, it is inherently very reliable and does not require built-in-test circuits to verify its safe operation.

For illustrative purpose, the following example is provided. The example assumes that an ultrasonic sensor 38 operates at 25 MHz and that the pulse generator 32 and sensor driver 36 excite the sensor with one cycle of a square wave, at a normal pulse repetition rate of 1 KHz. In such a case, the duty cycle is 0.04 μsec/1 msec=0.004%. If it is assumed that the instantaneous excitation current supplied to the sensor 38 and sensor cable 40, which is primarily a capacitive load) is 1 ampere, then the normal average current supplied into the fuel tank (or other environment) is 40 microamps. Further, if the normal drive voltage for the driver is 10V and the sensor driver 36 requires a 10V supply in order to generate its 1 ampere pulses, a value of 5,000 ohms for resistor 64 and 0.1 microfarads value for the capacitor 66 may be chosen. Under normal operating conditions, the capacitor 66 will only droop from its nominal 10V by 0.4V (or 4%). Then the RC circuit 62 has nearly 1 millisecond to recharge the capacitor 66 through resistor 64 back up to nearly 10V driving voltage.

If the pulse generator 32 fails and starts producing pulses at a faster repetition rate or a larger width, this increase in duty cycle would prevent the capacitor 66 from charging to the driving voltage of the sensor driver 36. Using the previous example, if the pulse repetition rate increased by a factor of 50, to 50 KHz, the maximum capacitor voltage would only be approximately 5V, limiting driver current and energy supplied to the sensor.

Figure 5:
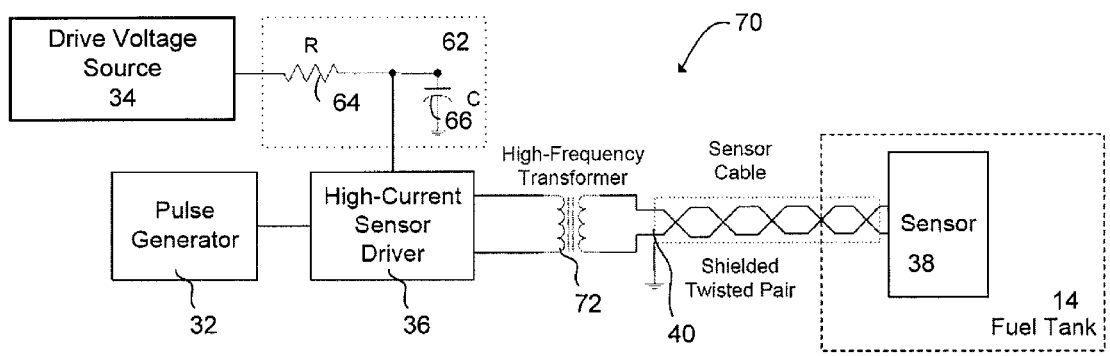

In addition to limiting energy under short-circuit conditions, aspects of the present invention may also be used to combat common mode lightning and other high voltage threats. Referring to FIG. 5, an exemplary system 70 in accordance with aspects of the present invention is illustrated. The system 70 is identical to the system 50, except that a high-frequency transformer 72 and the cable 40 is shielded twisted pair cable. The transformer 72 isolates the pulse generation and driver circuits from the sensor 38 in the fuel tank 14. Thus, the transformer 72 provides a barrier to DC current and limits low-frequency energy from entering the fuel tank. In addition, with appropriate wire voltage rating and mechanical spacing between windings, the transformer 72 acts as a barrier against common-mode lightning and other high-voltage threats.

When connected to transformer 72, cable 40 may take the form of a shielded, twisted-pair (balanced) wire that couples the transformer 72 to the sensor 38. The differential voltage across the sensor 38 that is generated by a lightning strike or similar electrical event will produce a very low (safe) voltage. In addition, the low inductance of the high-frequency transformer 72 (e.g., typically a small ferrite core with a small number of turns) will cause the core to saturate if it is subjected to high, continuous current, further limiting the energy transferred into the fuel tank.

Figure 6A:
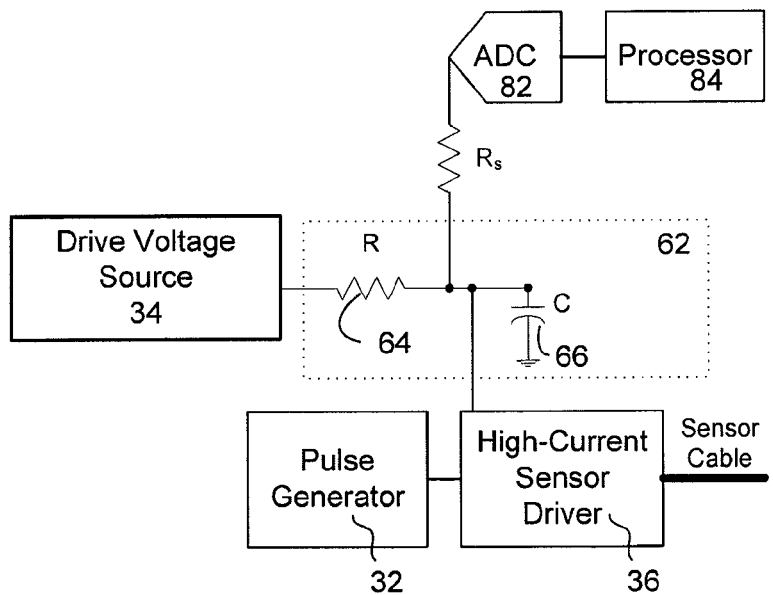
FIGS. 6A and 6B illustrate electrical components that may be used to sense a failure mode in accordance with aspects of the present invention.
Figure 6B:
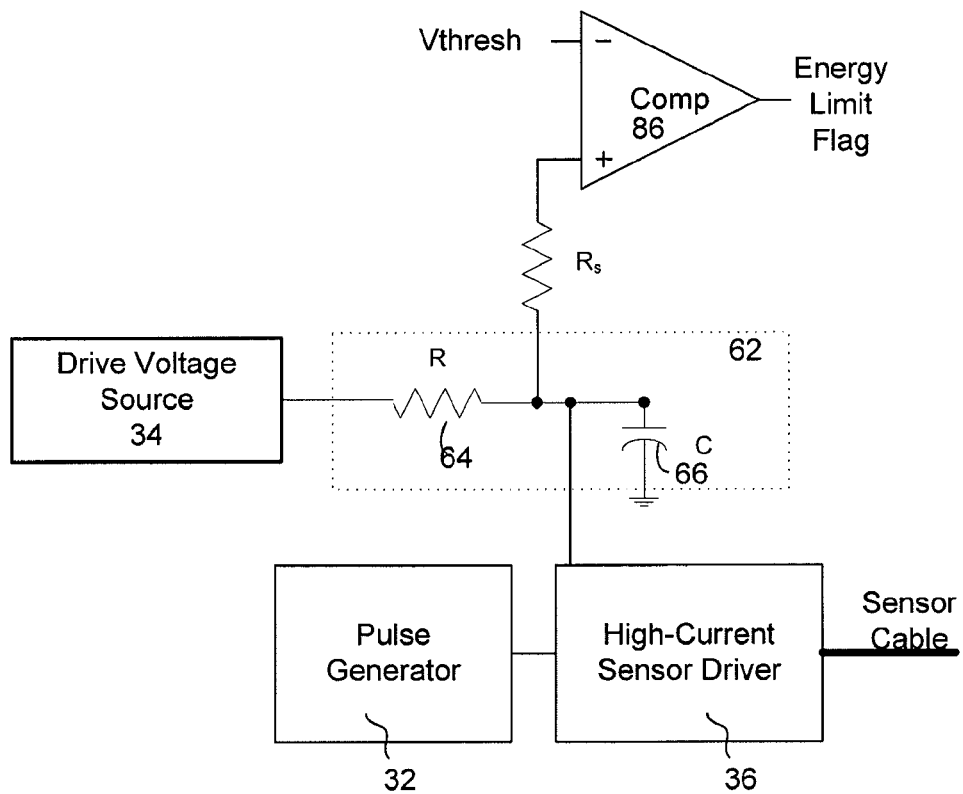

Referring to FIGS. 6A and 6B, other modifications of the systems 50 and 70 may include coupling one or more components (e.g., analog to digital converter 82 coupled to a processor 84, a comparator 86, etc.) to the RC circuit 62 to determine when the energy limiting circuit is active (e.g., when the RC circuit 62 is limiting energy to the sensor driver 38). When the average DC voltage at the capacitor 66 of the energy limiting circuit is below a prescribed value, the RC circuit 62 may be considered to be operating in energy-limiting mode. This DC voltage can be sensed via an analog-to-digital converter 82 as shown in FIG. 6A. The analog to digital converter 82 may be coupled to a processor 84 and/or to a storage medium (not shown). The analog to digital converter 82 may be used to measure and monitor voltage and/or current levels across one or more portions of the RC circuit 62. For example, the analog to digital converter 82 may be used to monitor voltage stored by the capacitor 66, voltage across resistor 64 and the like. The data obtained by the analog to digital converter 82 may then be converted to digital form and processed by processor 84 for any desired purpose (e.g., taking remedial action, shut down system, etc.).

In another embodiment illustrated at FIG. 6B, the DC voltage of the RC circuit 62 can be sensed using an analog comparator 86. The analog comparator 86 includes two inputs. A first input is a threshold voltage source. The threshold voltage source may be chosen to be at a voltage level that signifies that the capacitor 66 is not charging to the level required to drive the sensor driver 36, for example (e.g., the RC circuit 62 is operating in the energy limiting mode). When the RC circuit 62 is operating in the energy limiting mode, analog comparator 66 may output a digital flag or other indication mechanism. The digital flag may be input to any external device, including a processor, a display unit, a recorder, etc. to inform the receiving device that the RC circuit 62 is operating in the energy limiting mode. Generation and/or existence of the flag may be for any desired purpose (e.g., taking remedial action, shut down system, etc.).

In addition, FIGS. 6A and 6B indicate the use of a safety resistor, Rs, at the input of the voltage sensing elements (ADC or Comparator). This safety resistor ensures intrinsic safety by limiting the current into the sensor driver 36 in the event of a fault occurring in the voltage sensing element (such as a short circuit to a power supply), for example.

Figure 7:
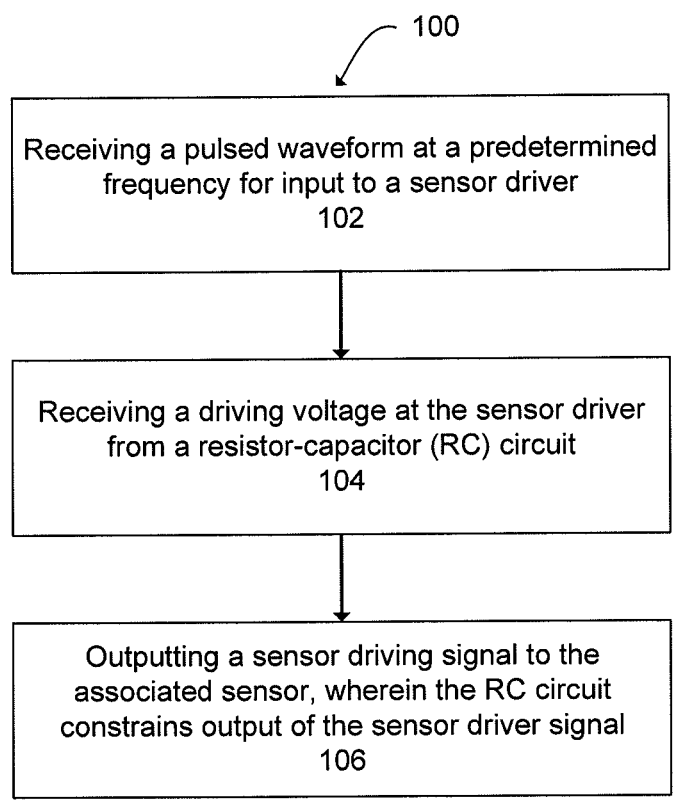
FIG. 7 is an exemplary method in accordance with aspects of the present invention.

An exemplary method 100 for limiting output energy to an associated sensor in accordance with aspects of the present invention is illustrated in FIG. 7. At block 102, a pulsed waveform 50 at a predetermined frequency is received for input to a sensor driver 36. At block 104, a driving voltage is received at the sensor driver from a resistor-capacitor (RC) circuit 62. At block 106, a sensor driving signal is output to the associated sensor 38, wherein the RC circuit constrains output of the sensor driver signal until the capacitor is charged in order limit average energy output to the associated sensor.

In one embodiment, the operation of the sensor driver may be controlled by a processor. The processor may also be operable to automatically adjust resistor 64 and capacitor 66 values so the capacitor can fully charge between outputting of the sensor driving signal to the associated sensor 38.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An energy limiting circuit comprising:
    a pulse generator operable to generate pulses at a prescribed frequency;
    a sensor driver operable to supply a pulsed excitation voltage to an associated sensor, wherein the sensor driver outputs a sensor driver signal that corresponds to a waveform received from the pulse generator;
    a resistance-capacitance (RC) circuit coupled between an associated drive voltage source and the sensor driver, wherein the RC circuit constrains output of the sensor driver signal to limit average current applied to the associated sensor, and
    wherein the RC circuit is operable to provide power from the associated drive voltage source to the sensor driver independent of the pulse generator.

2. The energy limiting circuit of claim 1, wherein the sensor driver is a high current sensor driver.

3. The energy limiting circuit of claim 2, wherein the current output to the associated sensor is 0.1 ampere or more.

4. The energy limiting circuit of claim 1, wherein the RC circuit includes a resistor and a capacitor coupled in series.

5. The energy limiting circuit of claim 1, wherein a time delay for charging the capacitor limits a duty cycle associated with the associated sensor.

6. An energy limiting circuit comprising:
    a pulse generator operable to generate pulses at a prescribed frequency;
    a sensor driver operable to supply a pulsed excitation voltage to an associated sensor, wherein the sensor driver outputs a sensor driver signal that corresponds to the waveform received from the pulse generator; and
    a resistance-capacitance (RC) circuit coupled between an associated drive voltage source and the sensor driver, wherein the RC circuit constrains output of the sensor driver signal to limit average current applied to the associated sensor,
    wherein a time delay for charging the capacitor limits a duty cycle associated with the associated sensor, and wherein the duty cycle is less than or equal to substantially about 0.1%.

7. The energy limiting circuit of claim 5, wherein values for the resistor and capacitor are chosen so the capacitor can charge sufficiently between active pulses of the pulse generator to provide a drive voltage to the associated sensor.

8. The energy limiting circuit of claim 1, further including a transformer coupled between the sensor driver and the associated sensor.

9. The energy limiting circuit of claim 8, further including a sensor cable for coupling the associated sensor to the transformer.

10. The energy limiting circuit of claim 9, wherein the sensor cable is a shielded twisted pair cable.

11. The energy limiting circuit of claim 10, wherein the sensor cable outputs a sensor output signal to instrumentation electronics.

12. The energy limiting circuit of claim 10, further including a processor for processing the sensor output signal received at that instrumentation electronics.

13. The energy limiting circuit of claim 1, further including a processor for controlling operation of at least the sensor driver and the pulse generator.

14. The current limiting circuit of claim 13, wherein the processor is operable to control and adjust one or more values of the resistor and/or capacitor so that the capacitor can fully charge between an interval of active pulses output from the sensor driver.

15. The current limiting circuit of claim 1, wherein the sensor driver outputs a pulsed signal to an ultrasonic transducer.

16. The current limiting circuit of claim 1, wherein the sensor driver outputs a pulsed signal to radio frequency transducer.

17. The current limiting circuit of claim 1 further including an analog to digital converter coupled to the RC circuit for monitoring voltage of the capacitor.

18. The current limiting circuit of claim 1 further including a comparator having a first input coupled to the RC circuit and a second input coupled to a threshold source.

19. A method for limiting output energy to an associated sensor, the method comprising:
    receiving from a pulse generator a pulsed waveform at a predetermined frequency for input to a sensor driver;
    receiving a driving voltage at the sensor driver from an associated drive voltage source via a resistor-capacitor (RC) circuit, the RC circuit being independent of the pulse generator; and
    outputting a sensor driving signal to the associated sensor, wherein the RC circuit constrains output of the sensor driver signal until the capacitor is charged in order to limit average energy output to the associated sensor.

20. The method of claim 19, further including controlling operation of the sensor driver with a processor.

21. The method of claim 20, further including automatically adjusting resistor and capacitor values so the capacitor can fully charge between outputting of the sensor driving signal to the associated sensor.

22. The method of claim 19, further including limiting a duty cycle associated with the associated sensor, wherein a time delay for charging the capacitor limits the duty cycle.

23. The method of claim 19, further including receiving a sensor output that corresponds to at least one physical parameter sensed by the sensor.

24. The method of claim 23, further including processing the sensor output to determine a fluid level.

25. The method of claim 19 further including coupling a comparator having a first input coupled to the RC circuit and a second input coupled to a threshold source for generating an energy limit flag.

26. A communication system for controlling a sensing device on an associated aircraft, the system comprising:
    a sensor operably positioned in a fuel tank of an associated aircraft, wherein the sensor senses at least one physical parameter associated with the fuel tank;
    a pulse generator operable to generate a waveform at a predetermined frequency;
    a sensor driver operable to supply a pulsed excitation voltage to the sensor, wherein the sensor driver receives an input signal and outputs a sensor driver signal that corresponds at least in part to the waveform received from the pulse generator; and a resistance-capacitance (RC) circuit coupled between an associated drive voltage source and the sensor driver, wherein the RC circuit constrains output of the sensor driver signal to limit average current applied to the associated sensor.

27. The system of claim 26, further including an output signal generated by the sensor, wherein the output sensor corresponds to at least one physical parameter sensed by the sensor.

28. The system of claim 26, wherein the at least one physical parameter is a fluid level associated with the fuel tank of an associated aircraft.

29. The system of claim 26, further including an in-tank fuel sensor coupled to the sensor driver, wherein the in-tank fuel sensor measures at least one physical property of an associated fuel tank.

30. The system according to claim 26, wherein the RC circuit is operable to provide power from the associated drive voltage source to the sensor driver independent of the pulse generator.

* * * * *